United States Patent [19]

Yuzurihara et al.

[11] Patent Number: 4,621,312

[45] Date of Patent: Nov. 4, 1986

[54] SWITCHING REGULATOR

[75] Inventors: Itsuo Yuzurihara, Kanagawa; Masami Arai, Tokyo, both of Japan

[73] Assignee: Kabushiki Kaisha Kyosan Seisakusho, Yokohama, Japan

[21] Appl. No.: 629,387

[22] Filed: Jul. 10, 1984

[30] Foreign Application Priority Data

Jul. 15, 1983 [JP] Japan ................................ 58-129635

[51] Int. Cl.$^4$ .......................................... H02M 3/335
[52] U.S. Cl. ..................................... 363/26; 363/132; 307/82
[58] Field of Search ..................... 307/85–87, 307/82; 363/24–26, 56, 98, 58, 132–134, 17, 136; 361/18, 93

[56] References Cited

U.S. PATENT DOCUMENTS

| | | | |
|---|---|---|---|
| 3,670,234 | 6/1972 | Joyce | 361/18 X |
| 4,063,306 | 12/1977 | Perkins et al. | 363/132 X |
| 4,176,392 | 11/1979 | Cronin et al. | 363/26 X |
| 4,449,175 | 5/1984 | Ishii et al. | 363/26 |

*Primary Examiner*—A. D. Pellinen
*Assistant Examiner*—Todd E. De Boer

*Attorney, Agent, or Firm*—Armstrong, Nikaido, Marmelstein & Kubovcik

[57] ABSTRACT

A switching regulator including a control circuit including a deviation detector for detecting a deviation between the detection value of the controlled variable and the reference value, a phase difference signal generator for generating a phase difference signal having a pulse width corresponding to the deviation, a reference signal shaper for shaping two reference signals of the same waveform having a phase difference corresponding to the pulse width of the phase difference signal, and a control signal generator for ON/OFF control of switching elements corresponding to the reference signals for controlling a switching circuit having transistors connected as the switching elements in a bridge formation, the switching elements are all driven with an equal ON/OFF ratio, the phase difference between the ON instructions to the two sets of the switching elements is controlled to control the output so that the control of the switching regulator is accomplished not by the pulse width for driving the switching elements but by the overlapping width of ON times of the two switching elements.

8 Claims, 9 Drawing Figures

- a···Output From 12
- b···Output From 21
- c···Output From 22
- d···Output From 31
- e···Output From 32
- f···Output From 33
- g···Output From 41a/41b
- h···Output From 41ā/41b
- i···Prim. Voltage Of Output Trans.
- j···Prim. Current Of Output Trans.
- k···Second. Rectific. Output Of Output Trans.

SWITCHING REGULATOR

BACKGROUND OF THE INVENTION

1. Field of the Invention

This invention relates to a switching regulator including a switching circuit with switching elements connected in a bridge formation, and more particularly to a switching regulator of this type having an improved control circuit for ON/OFF control of the switching elements.

2. Description of the Prior Art

Figure 1:
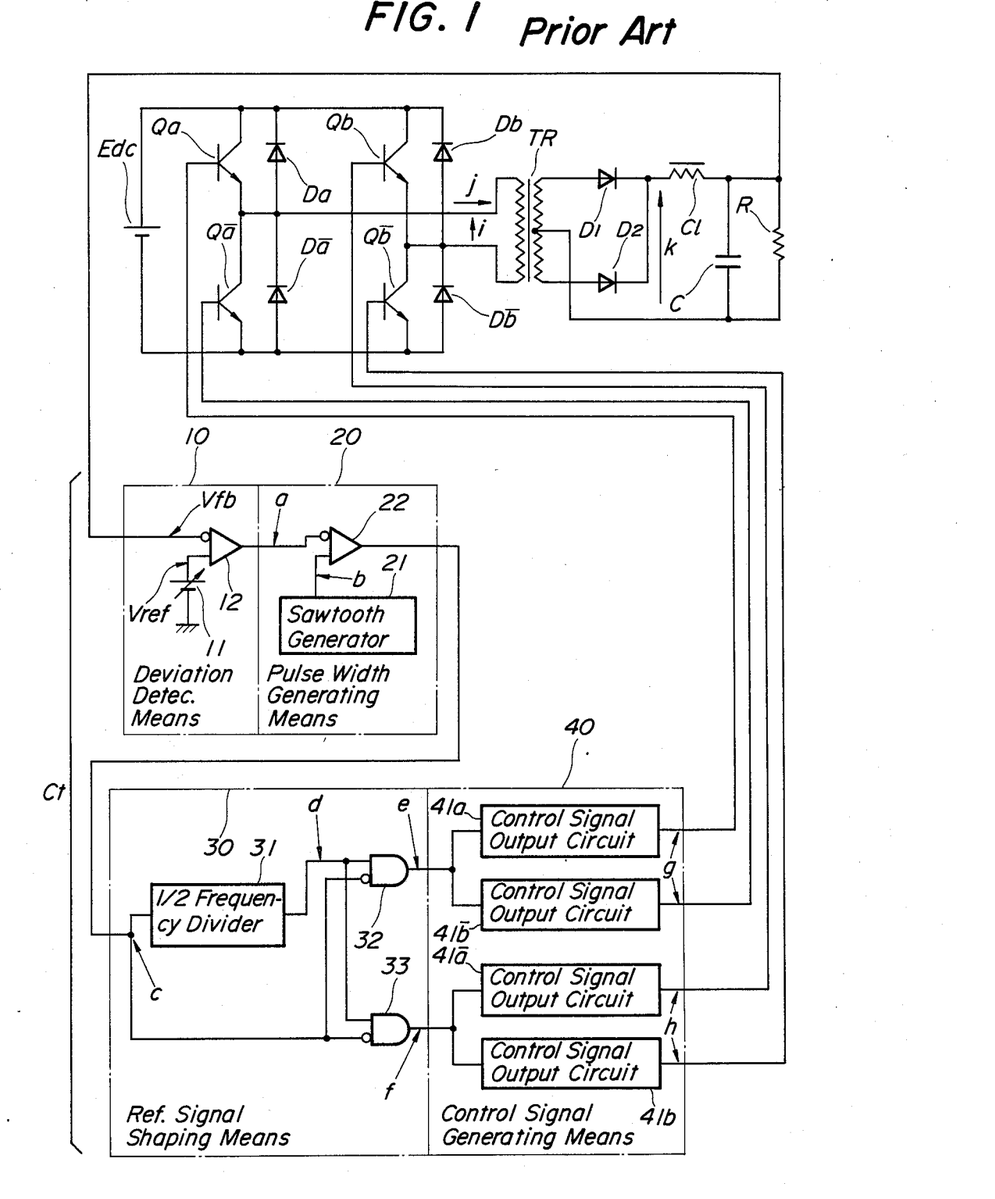
FIG. 1 is a circuit diagram of a conventional switching regulator.

As an example of conventional switching regulators of the pulse-duration modulation type having a bridge formation, there can be mentioned an arrangement as illustrated in FIG. 1.

The switching regulator as illustrated in FIG. 1 comprises transistors Qa to $\overline{Qb}$ connected in a bridge formation and constituting a switching circuit which periodically reverses the polarity of power from a DC power supply Edc so as to be output therefrom, diodes Da to $\overline{Db}$ each connected reversely in parallel to a corresponding transistor Qa to $\overline{Qb}$, respectively, to constitute a regenerative circuit, an output transformer TR with the transistors Qa to $\overline{Qb}$ and the diodes Da to $\overline{Db}$ connected to a primary side thereof, diodes D1 and D2, a coil Cl and a capacitor C connected to a secondary side of the output transformer TR for constituting a rectifying circuit, and a control circuit Ct for ON/OFF control of the transistors Qa to $\overline{Qb}$.

The control circuit Ct comprises a deviation detecting means 10 including a reference value setter 11 and an error amplifier 12, a pulse width signal generating means 20 including a sawtooth generator 21 and a comparator 22, a reference signal shaping means 30 including a ½ frequency divider 31 and logic operators 32, 33, and a control signal generating means including control signal output circuits 41a to $41\overline{b}$.

Figure 3:
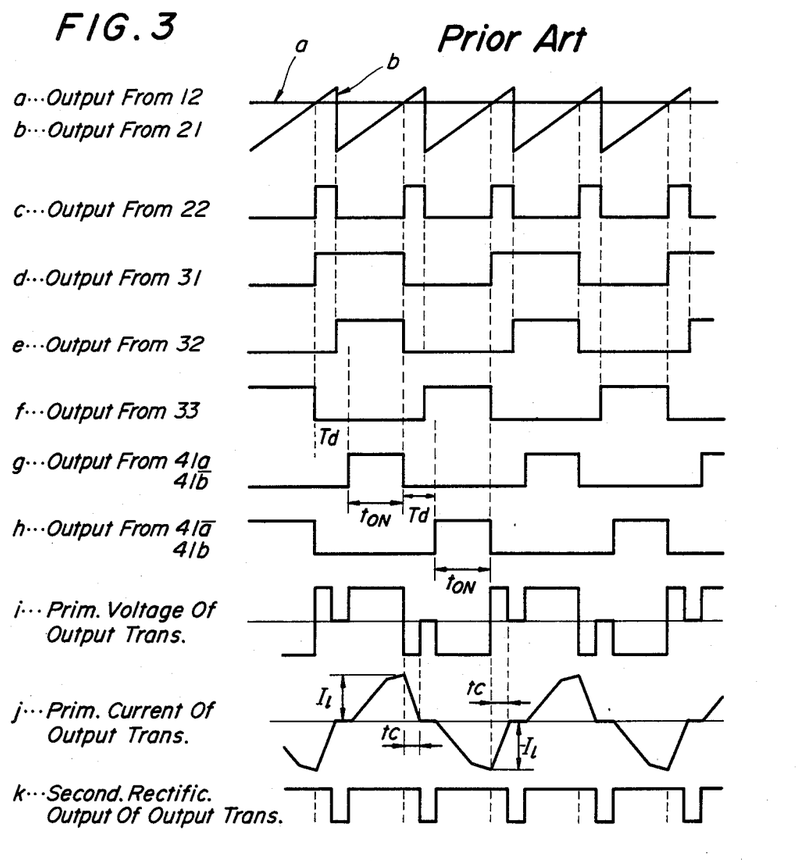
FIG. 3 is a waveform diagram showing waveforms appearing at various portions of the conventional switching regulator of FIG. 1.

The operation of the control circuit Ct will now be described referring to FIG. 3. In FIG. 3, a to k designate waveforms appearing at portions as denoted by the corresponding characters, respectively.

The deviation detecting means 10 detects, at the error amplifier 12 thereof, an output from the switching regulator to a load R, i.e., a deviation between the detection value Vfb of a controlled variable and a reference value Vref set by the reference value setter 11 and outputs a DC voltage a having a level corresponding to the deviation.

The pulse width signal generating means 20 compares, at the comparator 22 thereof, the output a with an output b from the sawtooth generator 21 and outputs a pulse width signal c having a duration corresponding to a portion of the sawtooth waveform b where it is above the DC voltage a.

The reference signal shaping means 30 divides the pulse width signal c into two. One of the divided signals c is frequency divided by the ½ frequency divider 31, and the output d of the frequency divider 31 is input to the logic operators 32 and 33, each comprised of an AND gate, in such a manner that it is applied, as it is, to the former and it is applied, after being inverted, to the latter. The other of the divided signals c is input, after inverted, to the logic operators 32 and 33. Thus, the reference signal shaping means 30 shapes reference signals e and f each having a duration smaller than that of the output d from the ½ frequency divider 31 by the pulse width of the pulse c.

The control signal generating means 40 receives the reference signal e at the control signal output circuits 41a and $41\overline{b}$ thereof, which correspond to the transistors Qa and $\overline{Qb}$ used as switching elements, respectively and receives the reference signal f at the control signal output circuits $41\overline{a}$ and 41b thereof, which correspond to the transistors $\overline{Qa}$ and Qb, respectively to output a control signal g from the former control signal output circuits 41a and $41\overline{b}$ and output a control signal h from the latter control signal output circuits $41\overline{a}$ and 41b. The control signal output circuits 41a to $41\overline{b}$ each include an amplifier and a pulse transformer and shape the control signals g and h to drive the two sets of transistors Qa, $\overline{Qb}$ and $\overline{Qa}$ and Qb, respectively. In order to protect the transistors, a delay time Td is set to a sufficient length as compared with a length of the storage time Tstg + the fall time Tf of the transistors Qa to Qb.

In the switching regulator, the two sets of transistors Qa, $\overline{Qb}$ and $\overline{Qa}$, Qb are alternately turned on and off in response to the control signals from the control circuit Ct so that the primary side of the output transformer TR is supplied with a DC voltage from the DC power supply Edc alternating in polarity to obtain a secondary voltage/current. The obtained voltage and current is rectified so as to be supplied to the load R.

Figure 2:
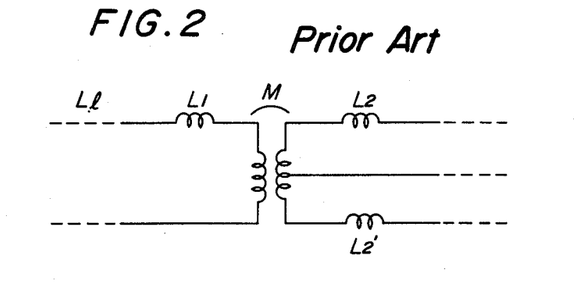
FIG. 2 is a circuit diagram of an equivalent circuit of an output transformer for use in the switching regulator of FIG. 1.

In this case, as illustrated in FIG. 2, the output transformer TR has leakage inductances L1, L2 and L2'. Energy stored by a synthetic inductance of the leakage inductances L1, L2 and L2' and an inductance Ll included in the wiring, from a current Il flowing through the inductances, is regenerated to the DC power supply Edc. The regeneration time tc (refer to (j) of FIG. 3) can be calculated as follows if there are no factors of loss:

$$\tfrac{1}{2} L I_l^2 = Edc \int_o^{tc} I_l \left(1 - \frac{t}{tc}\right) dt$$

$$= Edc I_l \left(\left(t - \frac{t^2}{2tc}\right)\right)_0^{tc}$$

$$= \tfrac{1}{2} Edc \, I_l \, tc$$

$$\therefore tc = \frac{L I_l}{Edc}$$

As apparent from the above calculation, the regeneration time tc varies depending upon the value of the load current Il. The ON times of the switching elements, i.e., transistors Qa to $\overline{Qb}$ also vary accordingly.

During the regeneration time tc, the output transformer TR acts as an electromotive force so that the primary voltage has a polarity reversed in relation with that at a time of power supply as shown in FIG. 3(i). This portion also appears as a part of a secondary rectification output of the output transformer TR. The waveform differs from the control signals g and h as shown in FIG. 3(k).

On the other hand, the time during which a current is supplied to the bases of the transistors Qa to $\overline{Qb}$ is a duration $t_{ON}$ as shown in FIG. 3(g) and (h). The duration $t_{ON}$ is varied depending upon a control rate. In other words, the ON-time Ton of signals g and h is varied from the maximum length of a half cycle of the drive frequency (the output from the ½ frequency divider) subtracted by the delay time Td to the minimum length of O.

In general, a pulse transformer is used for base driving of each of the transistors Qa to Q$\overline{\text{b}}$ and the exciting energy thereof is utilized for supplying reverse bias current to the base.

In this connection, it is to be noted that if the control rate is changed, the voltage applying time of the pulse transformer is changed, which in turn changes the amount of the stored exciting energy. Therefore, almost no exciting energy can be utilized when the period of application is short. For this reason, the OFF time for cancelling the accumulated carrier of the switching element varies from case to case, causing misoperation or partial magnetization due to fluctuation of the time of application of power to the output transformer. It has been desired in the base drive method as described above to solve the above-mentioned problems and to utilize full exciting energy irrespective of the pulse duration.

SUMMARY OF THE INVENTION

It is therefore an object of the present invention to provide a switching regulator excellent in a power conversion efficiency and controllability, having high reliability and capable of supplying sufficient reverse bias current to transistors irrespective of the driving conditions of various pulse durations.

In accordance with the present invention, a switching regulator including a switching circuit having switching elements of transistors connected in a bridge formation comprises a deviation detecting means for detecting a deviation between the detection value of the controlled variable and the reference value, a phase difference signal generating means for generating a phase difference signal having a pulse width corresponding to the deviation, a reference signal shaping circuit for shaping two reference signals of the same waveform having a phase difference therebetween corresponding to the pulse width of the phase difference signal, and a control signal generating means for ON/OFF controlling the transistors by corresponding reference signals for controlling the switching circuit.

The characteristic feature of the operation of the present invention is that the transistors are controlled not by a pulse width corresponding to the control signal but are all operated with an equal ON/OFF time ratio and that the output is controlled by controlling a phase difference between ON instructions to the two sets of transistors. In other words, the control of the switching regulator is accomplished not by a pulse width for the respective switching elements but by an overlapped width of ON times of the two sets of the switching elements.

Therefore, in accordance with the present invention, the energy stored in the synthetic inductance L as described above appears as a reflux through the switching element (transistor), which remains ON under the condition where the power supply to the output transformer is shut off, and the diode connected reversely in parallel to another switching element (transistor) and, thereafter, it is regenerated to the DC power supply through the two diodes. In this case, the power supply loop mode from the power source, the reflux loop mode and the regenerative loop mode are changed in this order without shock, so that the energy stored in the inductance causes no surge voltage.

On the other hand, the supply of a base reverse bias current to the transistor is generally accomplished by utilizing the exciting energy of the driving pulse transformer. The present invention also employs this method, but it differs from the conventional technique in that the application time of a signal to the pulse transformer is constant irrespective of the width of the output pulse. For this reason, even if the output instruction of the control signal is at any control condition of from 100% to 0%, sufficient base reverse bias current can be supplied so that transistors of large current can be operated at high speed. Furthermore, the storing time Tstg+the falling time Tf can be made uniform and partial magnetization can be prevented irrespective of the condition of the load or the particular characteristic of the output transformer.

DESCRIPTION OF THE PREFERRED EMBODIMENT

Referring now to the drawings, there is illustrated a preferred embodiment of the present invention.

Figure 4:
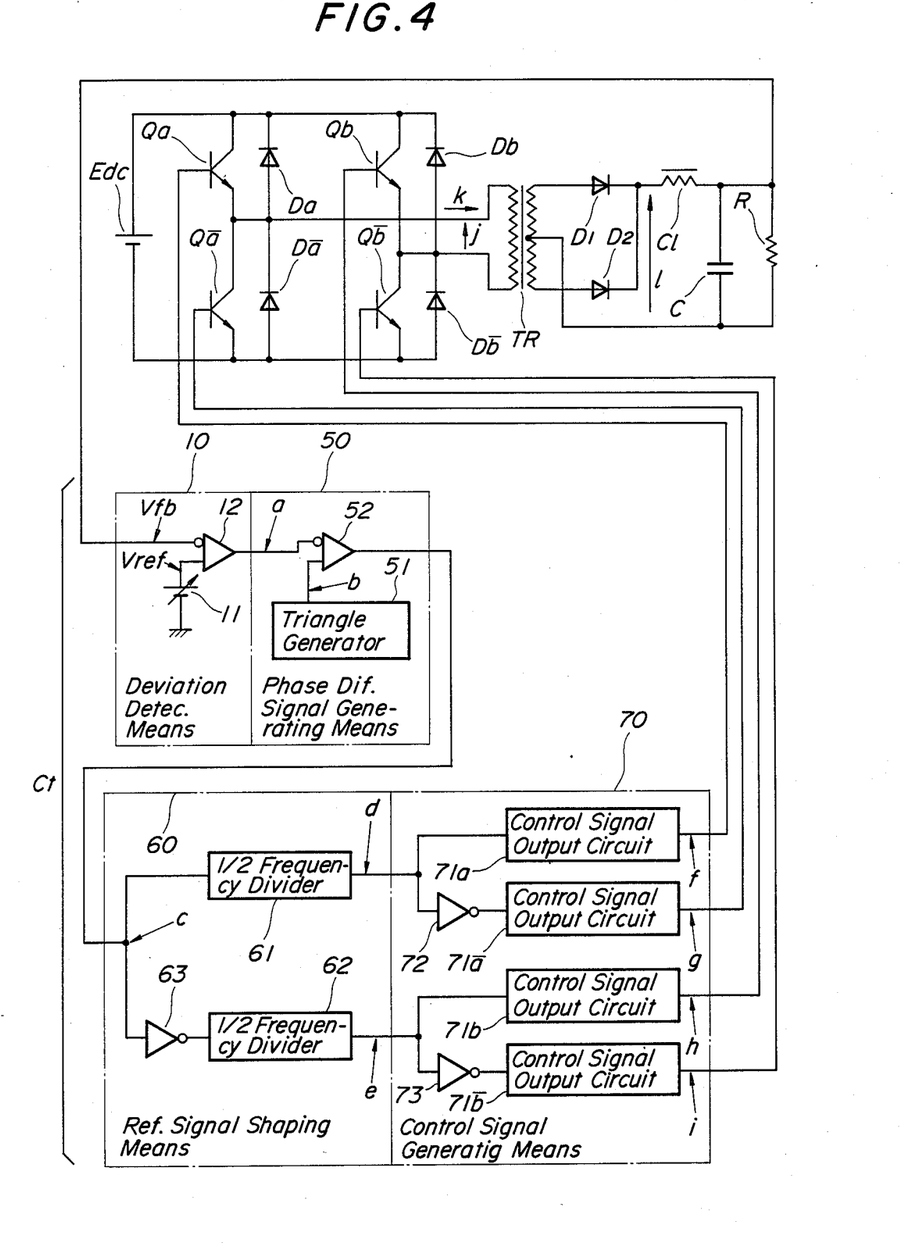
FIG. 4 is a circuit diagram of a switching regulator according to a first embodiment of the present invention.
Figure 5:
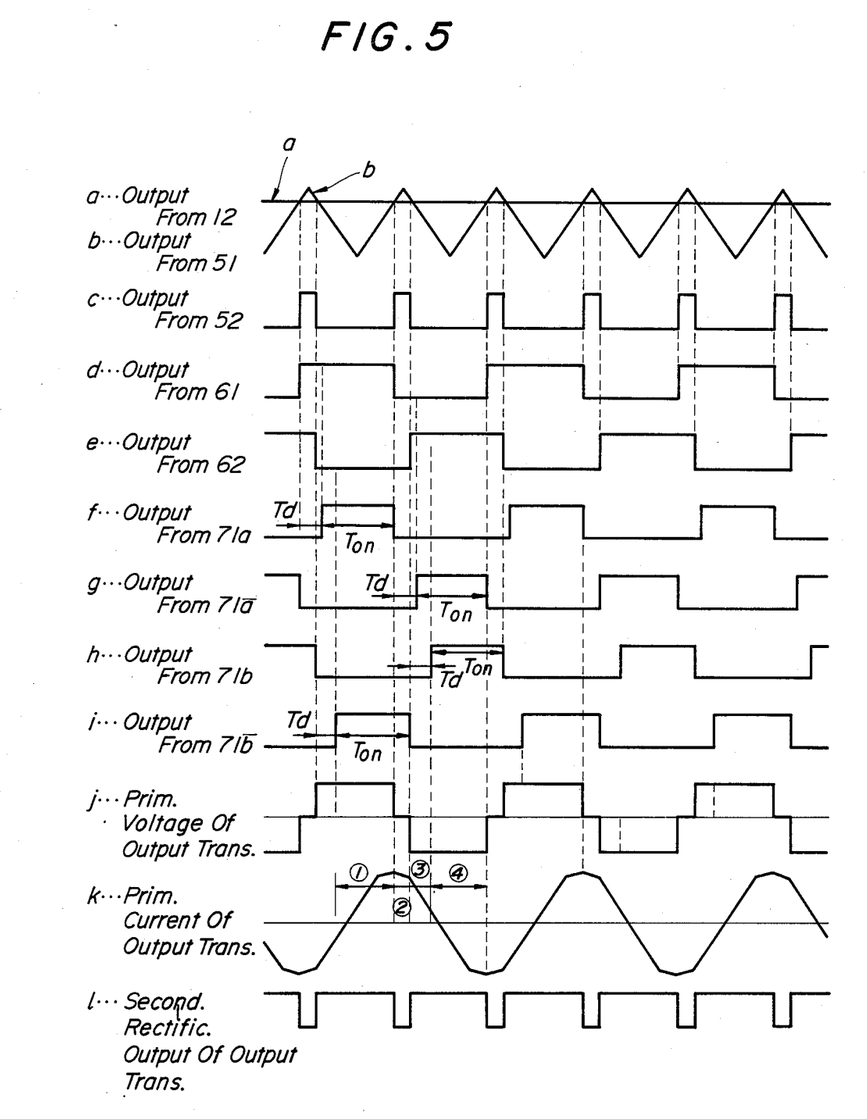
FIG. 5 is a waveform diagram of waveforms appearing at various portions of the switching regulator of the first embodiment.

FIG. 4 is a circuit diagram of one form of a switching regulator embodying the present invention, and FIG. 5 is a waveform diagram of waveforms appearing at various portions of the switching regulator of this embodiment.

The switching regulator according to the first embodiment has substantially the same basic construction as the switching regulator as shown in FIG. 1. It comprises transistors Qa to Q$\overline{\text{b}}$ connected as switching elements in a bridge formation to form a switching circuit, diodes Da to D$\overline{\text{b}}$ connected reversely in parallel to the corresponding transistors Qa to Q$\overline{\text{b}}$, respectively, to form a reflux circuit and a regenerative circuit, an output transformer TR including the bridge formed of the transistors Qa to Q$\overline{\text{b}}$ and diodes Da to D$\overline{\text{b}}$ connected to the primary side thereof, diodes D1, D2, a coil Cl and a capacitor C connected to the secondary side of the output transformer TR to form a rectifying circuit, and a control circuit Ct for ON/OFF controlling the transistors Qa to $\overline{Qb}$.

The control circuit Ct comprises a deviation detecting means 10 including a reference value setter 11 and an error amplifier 12, a phase difference signal generating means 50 including a triangle generator 51 and a comparator 52, a reference signal shaping means including ½ frequency dividers 61, 61 and a inverter 63, and a control signal generating means 70 including control signal output circuits 71a to 71$\overline{b}$ and inverters 72, 73.

The operation of the control circuit Ct will be described referring to FIG. 5. In FIG. 5, character a to l show the waveforms appearing at portions denoted by the same characters in FIG. 4.

The deviation detecting means 10 is substantially the same as that of FIG. 1 and detects, by the error amplifier 12, a deviation between a detection value of an output to a load R, i.e. a controlled variable and a reference value Vref set by the reference value setter 11 to output a DC voltage a having a level corresponding to the deviation.

The phase difference signal generating means 50 compares, by the comparator 52, the output a and an output b from the triangle generator 51 including an astable multivibrator and outputs a phase difference signal c having a waveform which is high when a>b and low when a<b.

The phase difference signal c is divided into two and input to the reference signal shaping means 60. One is input to the ½ frequency divider 61 and the other is input to the ½ frequency divider 62 after inverted by the inverter 63. The frequency dividers 61, 62 are inverted at the rising of the input waveform and divide the frequency of the input into ½. The frequency dividers 61 and 62 are synchronized with each other so that the output of the frequency divider 62 may fall below the rising of the output of the frequency divider 61 and the following fall thereof and output reference signals d and e, respectively. Each of the reference signals d and e has a high portion and a low portion of equal duration which is further equal to the time duration of one triangle of the triangle waveform. The reference signals d and e do not change in the time width of their high portions or waveforms thereof but change in phase difference between the signals d and e even if the deviation is changed due to a change in the reference value Vref or a change of the detection value Vfb of the controlled variable.

The output signal d from the ½ frequency divider 61 is divided into two and input to the control signal generating means 70. Signal d is divided into 2 signals, and one of the divided output signals d is input to the control signal output circuit 71a, and the other is input to the control signal output circuit 71$\overline{a}$ after inverted by the inverter 72. Similarly, the output from the ½ frequency divider 62 is also divided into two and input to the control signal output circuits 71b and 71$\overline{b}$. The outputs of the control signal generating means 70 are input from the output circuits 71a to 71$\overline{b}$ to the bases of the corresponding transistors Qa to $\overline{Qb}$ to drive the transistors Qa to $\overline{Qb}$, respectively.

Each of the control signal output circuits 71ato 71$\overline{b}$ includes therein a signal delay circuit and an amplification circuit (not shown). The signal delay circuit provides a time delay of Td to the rising of the output of the respective control signal output circuit by catching the rising or the leading edge of the input waveform. As to the falling or trailing edge, it is synchronized with that of the input waveform (FIG. 5 (f) to (i)). This delay time Td is so determined as to have sufficient length relative to the storing time Tstg+the falling time Tf. The delayed signal is amplified by the amplification circuit and input to the base of the respective transistor Qa to $\overline{Qb}$ to drive it. This delay of signal is necessary to avoid possible short-circuiting between a pair of transistors (for example, transistors Qa and $\overline{Qa}$) coupled vertically as viewed in FIG. 4, which will be caused if a base signal is applied to the transistor $\overline{Qa}$ during the storing time Tstg+the falling time Tf after shutting off of the base signal to the transistor Qa, in which the transistor Qa cannot resume full blocking ability.

Each of the control signal output circuits 71a to 71$\overline{b}$ is provided with a driving pulse transformer to effect driving, rapid cutoff and isolation of the transistor Qa to $\overline{Qb}$ from the main circuit.

The operation of the switching regulator using the above-mentioned control circuit Ct will now be described.

The two sets of switching elements (transistors Qa, $\overline{Qb}$ and transistors $\overline{Qa}$, Qb) which receive the control signals f to i as respective base signals thereto are operated to turn on and turn off, respectively. If it is assumed that the primary winding of the output transformer TR is supplied with a positive-going power when the voltage j and the current k are in the polarities as indicated by arrows in FIG. 4, this mode corresponds to a period of time when the logic product or AND of the control signals f and i is high. More particularly, both the transistors Qa and $\overline{Qb}$ are ON. On the other hand, the mode in which the output transformer TR is supplied with a negative-going power corresponds to a period of time when the logic product or AND of the control signals g and h is high, i.e., both the transistors $\overline{Qa}$ and Qb are ON.

The primary voltage and the primary current of the output transformer TR will be described hereinafter referring to the waveforms j and k of FIG. 5.

First, the period ① of the waveform k is a portion where the logic product of the waveforms f and i is high and the transistors Qa and $\overline{Qb}$ receive base signals. However, the current has been regenerated to the DC power supply Edc through the diodes Da and $\overline{Db}$ before the duration ①, and this state is continued until the waveform k passes through O. Therefore, in this period, the transistors Qa and $\overline{Qb}$ remain off even if they are supplied with the base signals. After consumption of the regenerative current, the transistors Qa and $\overline{Qb}$ are turned on and the output transformer TR is supplied with power so that current is increased according to the inductances within the closed circuit. During the term of ①, the waveform j is applied with a positive-going voltage.

Second, during the period ② of the waveform k, the waveform i is high but the waveform f becomes low, so that the transistor Qa is turned off and the power supply to the output transformer TR is cut off. However, due to the energy stored at the output transformer TR, reflux current flows through a closed circuit of the transformer TR→the transistor $\overline{Qb}$→the diode $\overline{Da}$. During this period, the waveform k decreases because part of the stored energy is lost by resistances in the closed circuit. In this period, the primary voltage j is substantially O.

Third, during the period ③ of the waveform k, the waveform i also becomes low and the transistor $\overline{Qb}$ is turned off. As a result, the regenerative current flows through the closed circuit of the output transformer TR→the diode Db→the DC power source Edc→the diode D$\bar{\text{a}}$, and the stored energy is regenerated at the DC power supply Edc. Since the output transformer TR acts as an electromotive force, the waveform j appears in the negative direction and the waveform k decreases according to the inductances in the closed circuit. During this period, the waveform g is changed to high and the transistor Q$\bar{\text{a}}$ receives a base signal.

Fourth, the period, ④ of the waveform k is a portion where the logic product of the waveform g and the waveform h is high and the transistors Q$\bar{\text{a}}$ and Q$\bar{\text{b}}$ receive base signals. However, from the mode, ③, the current has been regenerated to the DC power supply Edc through the diodes D$\bar{\text{a}}$ and Db and this operation continues until the waveform k passes through O. Therefore, during this period, the transistors Q$\bar{\text{a}}$ and Qb remain off even if they receive the base signals. After consumption of the regenerative current, the transistors Q$\bar{\text{a}}$ and Qb are turned on and the output transformer TR is supplied with power so that the power is increased according to the inductances within the closed circuit. During the period ④, the waveform j is applied with a negative voltage.

As described above, regeneration phenomenon is caused immediately after shut off of the power and voltage is induced in the opposite direction to that at a time of power supply in the conventional switching regulator, while the induced voltage appears only through a reflux mode after shut off of power supply, as can be seen from the waveforms and k, in the present invention. This reflux mode is shifted into the following power supply mode of opposite direction continuously and without changing the direction. These two modes are ③ and ④ of the waveforms j and k.

The above description is made referring to only one waveform but a similar operation is repeated in each of the waveforms. As a result, the primary input as the waveforms j and k are received and the secondary rectification output as the waveform 1 is obtained.

Thus, according to the present invention the ON-time Ton of each of the transistor Qa to Qb as shown in waveforms f to i is constant, irrespective of the control conditions and it has a length of a half cycle of the drive frequency substracted by the delay time Td, the time period in which the exclusive OR of the waveforms d and e of the reference signals is high, i.e., the overlapping portion of the ON times, corresponds to the output portion of the waveform k, so that an output based on the two reference signals can be obtained and excellent controllability can be attained.

Although a triangle generator 51 is employed in the phase difference signal generating means 50 in the first embodiment as described above, a sawtooth generator may alternatively be employed.

Figure 6:
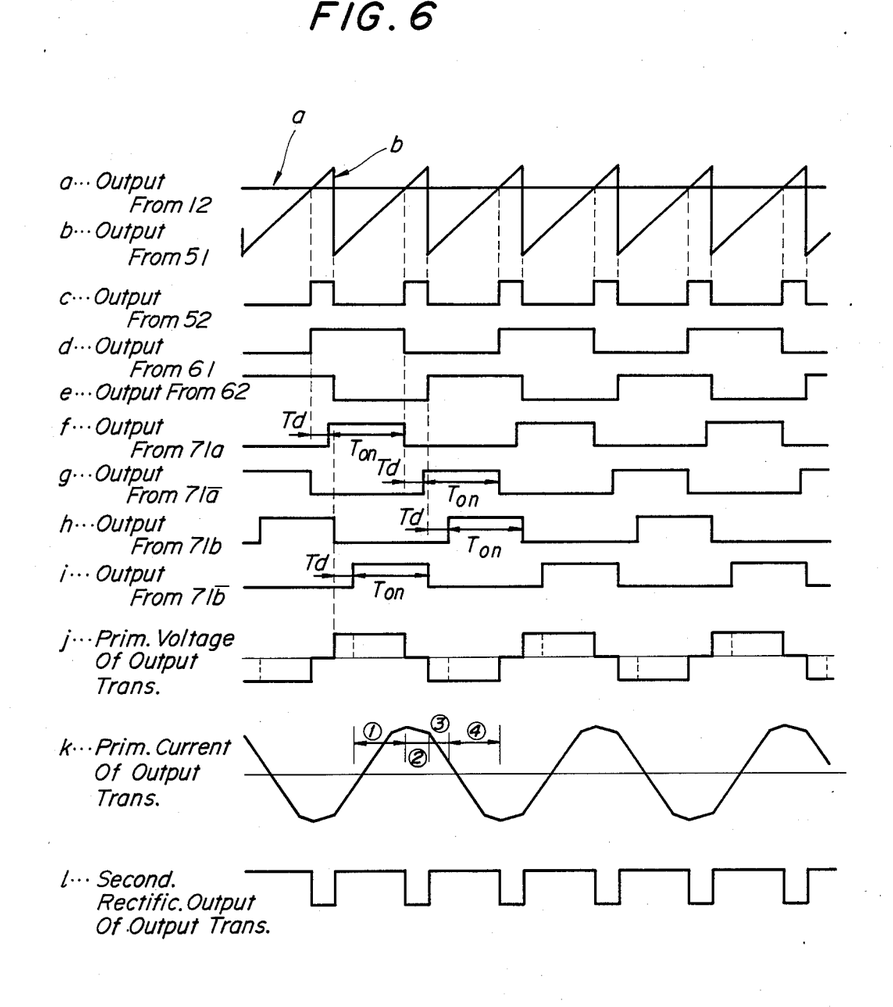
FIG. 6 is a waveform diagram of waveforms appearing at various portions of a switching regulator partly modified from the embodiment of FIG. 4.

FIG. 6 shows waveforms appearing at various portions of a modification of the first embodiment in which the sawtooth generator is used instead of the triangle generator. In FIG. 6, the waveforms a to k are substantially the same as those of the first embodiment as shown in FIG. 4 except for the waveform b. Thus, it is appreciated that the desired operation can be accomplished by either of the triangle waveform and the sawtooth waveform.

Figure 7:
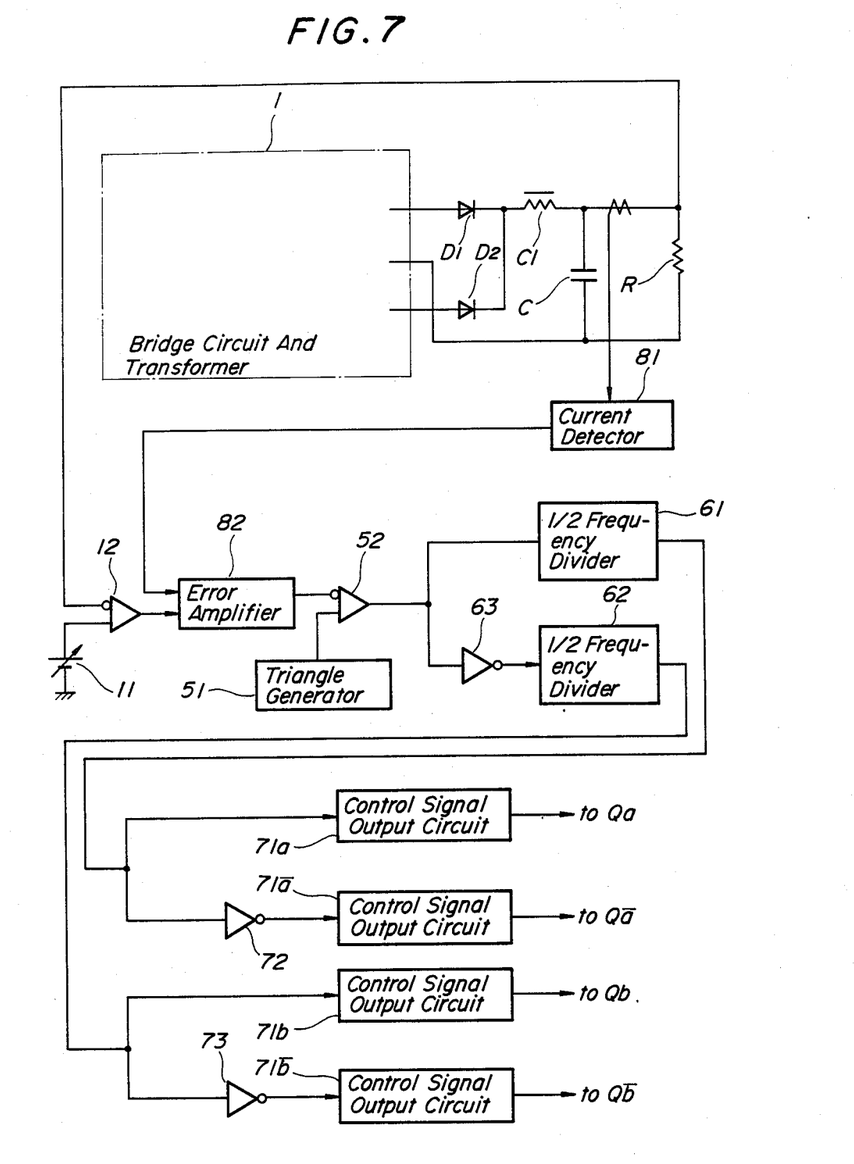
FIG. 7 is a block diagram of a switching regulator according to a second embodiment of the present invention.

A second embodiment of the present invention will now be described referring to FIG. 7.

This embodiment is provided with an overcurrent limiting function in addition to the functions of the first embodiment. Since the arrangement of this embodiment is substantially the same as that of the first embodiment, except for that of the overcurrent limiting means, the components of such arrangement are denoted by the same numerals and characters and the description thereof is omitted here. In FIG. 7, 1 designates a portion including a bridge circuit comprised of transistors Qa to Q$\bar{\text{b}}$ and diodes Da to D$\bar{\text{b}}$ and an output transformer TR which are arranged in substantially the same manner as in the first embodiment.

The overcurrent limiting means is provided with a current detector 81 for detecting a current supplied to a load R, and an error amplifier 82 which is responsive to the detection value to correct a deviation from an error amplifier 12 so as to be input to a comparator 52. With this arrangement, the output of the error amplifier 12 is imparted with a minor loop of the error amplifier 82 to enhance the stability of the control system and impart an additional function of overcurrent limiting.

Figure 8:
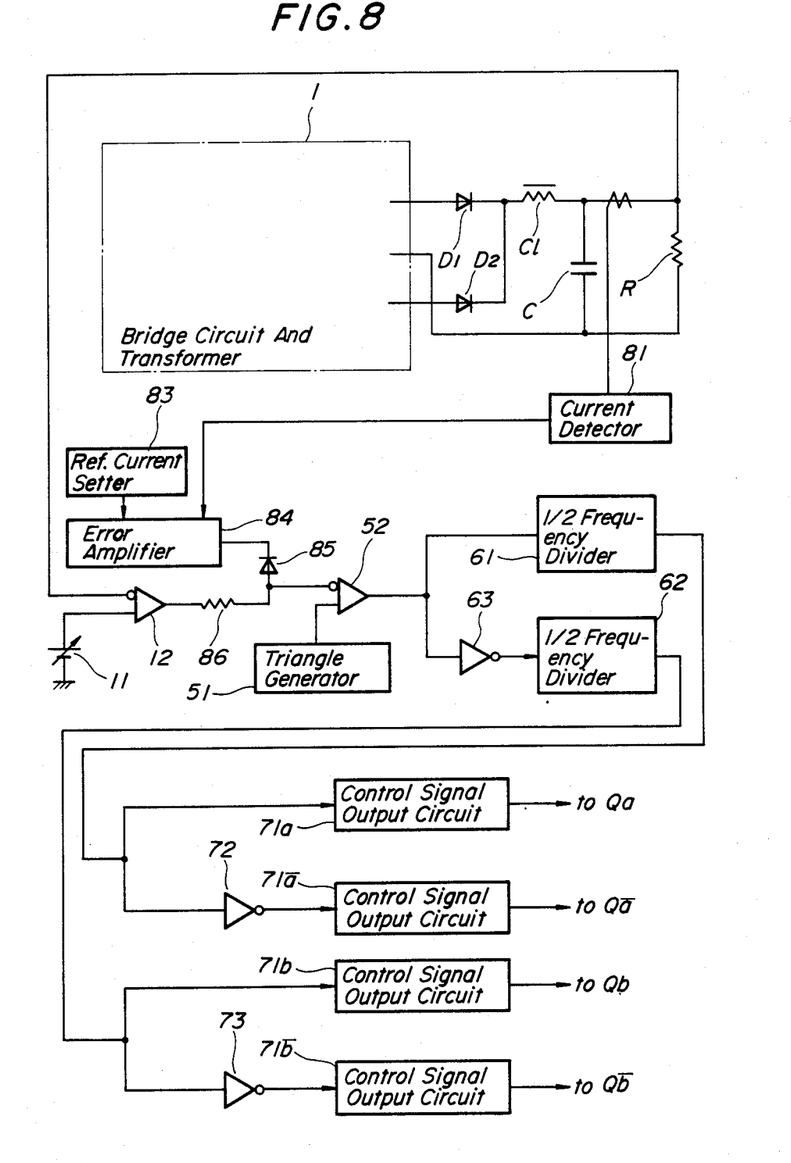
FIG. 8 is a block diagram of a switching regulator according to a third embodiment of the present invention.

A third embodiment of the present invention will now be described referring to FIG. 8.

This embodiment has an overcurrent limiting function by an arrangement different from that of the second embodiment. The remaining general arrangement of this embodiment is substantially the same as those of the first and the second embodiments.

The overcurrent limiting means of this embodiment is provided with a current detector 81 for detecting a current supplied to a load R, a reference current setter 83 for setting a reference current value, an error amplifier 84 for detecting a deviation between the detection value and the reference value, and a diode OR gate circuit comprised of a diode 85 and a resistor 86. This overcurrent limiting function operates in such a manner that in a constant voltage operation, the error amplifier 84 is normally saturated and the diode 85 is reversely biased, and the error amplifier 84 is in preference to the error amplifier 12 and the diode 85 is forwardly biased when a current exceeding the reference value flows. As a result, the input to the comparator 52 is shut off to limit the output current.

Figure 9:
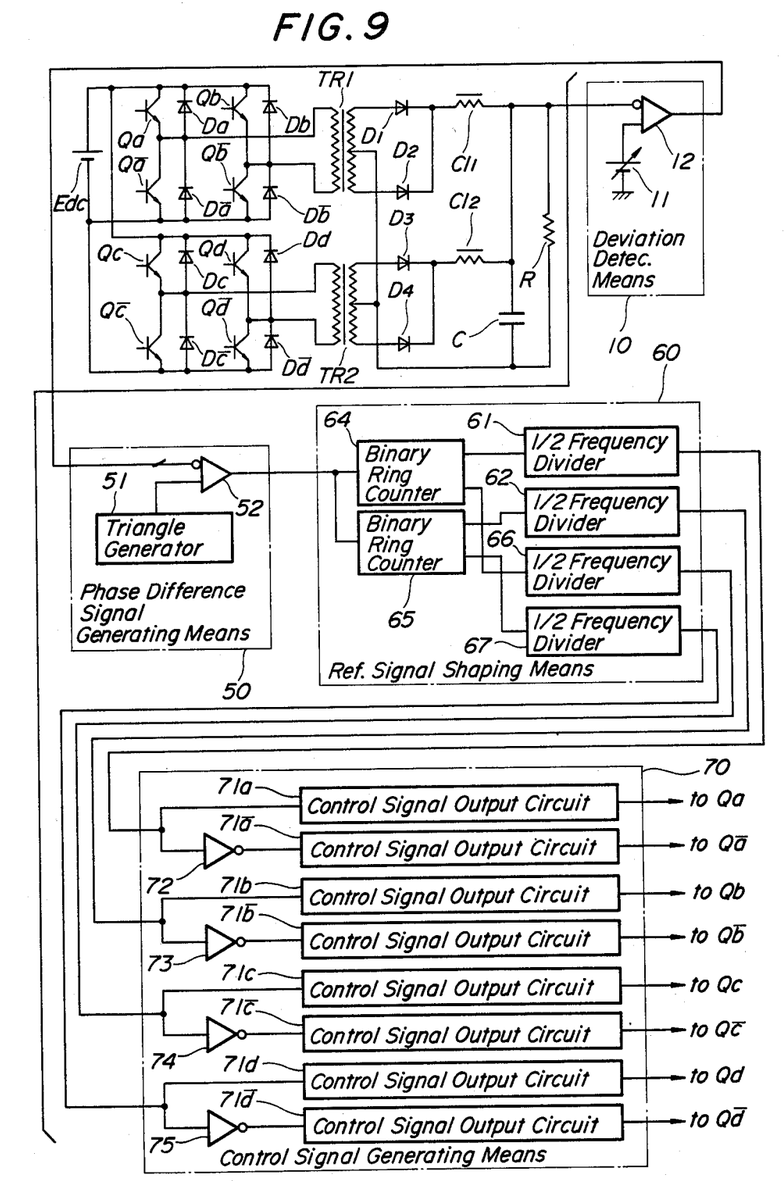
FIG. 9 is a block diagram of a switching regulator according to a fourth embodiment of the present invention.

A fourth embodiment of the present invention will now be described referring to FIG. 9.

This embodiment is so devised as to operate two circuits in parallel. More specifically, power is supplied to one load R by two switching regulators.

This embodiment is comprised of a first regulator including a bridge circuit formed of transistors Qa to Q$\bar{\text{b}}$ and diodes Da to D$\bar{\text{b}}$, an output transformer TR1, and a rectification circuit formed of diodes D1 and D2, a coil Cl1 and a capacitor C; a second regulator including a bridge circuit formed of transistors Qc to Q$\bar{\text{d}}$ and diodes Dc to D$\bar{\text{d}}$, an output transformer TR2 and a rectification circuit formed of diodes D3 and D4, a coil Cl2 and a capacitor C (in common with the above capacitor C); and a control circuit Ct.

The control circuit Ct comprises a deviation detecting means 10, a phase difference signal generating means 50, a reference signal shaping means 60, and a control signal generating means 70. The deviation detecting means 10 and the phase difference signal generating means 50 are substantially the same as those of the first embodiment and the description thereof is omitted here. The reference signal shaping means 60 and the control signal generating means 70 will now be described.

The reference signal shaping means 60 has two sets of ½ frequency dividers 61, 62 and 66, 67 corresponding to the first and the second regulators, respectively, and binary ring counters 64 and 65 corresponding thereto respectively. The ring counter 64 is connected to the ½ frequency dividers 61 and 66, while the ring counter 65 is connected to the ½ frequency dividers 62 and 67. The ring counters 64 and 65 are in synchronism with each other.

The control signal generating means 70 has functions associated with the two circuits and comprises a set of control signal output circuits 71a to 71b for transmitting control signals to the respective transistors Qa to Qb and inverters 72 and 73 and a set of the control signal output circuits 71c to 71d for transmitting control signals to the respective transistors Qc to Qd and inverters 74 and 75.

With this arrangement, control signals are transmitted to the two circuits from the control circuit Ct to switch the DC power supply Edc so as to obtain rectified output at the secondary sides of the respective output transformers TR1 and TR2. In this case, it is easy to carry out parallel operation by transmitting the control signals in phase, but in the present embodiment, the control signals are transmitted with 90° phase shift. This enables reduction of ripple and reduction in size of a smoothing circuit and enables the capacity to be increased.

As described above, according to the present invention, the switching elements constituting the bridge circuit are all driven by equal ON/OFF duration ratio and the phase difference between the ON instructions to the two sets of the switching elements is controlled to control the output. Therefore, the energy stored by the synthetic inductance is once refluxed and thereafter regenerated to the DC power supply. As a result, the power can be regenerated without producing a surge, and power conversion efficiency can be improved. Furthermore, since the output can be controlled by changing the phase difference between the control signals, excellent controllability can be attained. Since the ON/OFF duration ratio of the switching elements is constant irrespective of the level of the output, sufficient reverse bias can be applied to the respective switching element to prevent possible partial magnetization. Thus, the present invention can provide a switching regulator which is capable of switching large-current transistors at a high speed.

We claim:

1. A switching regulator including a switching circuit having transistors connected as switching elements in a bridge formation, comprising:
    a deviation detecting means for detecting a deviation between the detection value of a controlled variable and a reference value;
    a phase difference signal generating means for generating a phase difference signal having a pulse width corresponding to the deviation;
    a reference signal shaping means for shaping two reference signals such that they have the same, constant waveforms, each having an ON-time and an OFF-time equal to the cycle of said phase difference signal, said reference signals having a phase difference therebetween which is equal to the pulse width of said phase difference signal; and
    a control signal generating means, including a delay means and adapted to output control pulse signals each responsive to the respective ON- or OFF-time of said two reference signals and having a width shorter, by a delay time produced by said delay means, than said ON- or OFF-time of said reference signals, said control signal generating means for controlling the ON/OFF status of the respective transistors, thereby to control the switching circuit.

2. A switching regulator as claimed in claim 1, which further comprises an overcurrent limiting means including a current detector for detecting a current supplied to a load and an error amplifier means for correcting the deviation detected by the deviation detecting means based on the detection value of the current detector and for inputting the output of said error amplifier to the phase difference signal generating means.

3. A switching regulator as claimed in claim 1, which further comprises an overcurrent limiting means including a current detector for detecting a current supplied to a load, a reference current setter means for setting a reference value of current, said overcurrent limiting means and said reference current setter means providing inputs to an error amplifier whose output is received by a diode OR gate circuit used in detecting the deviation between the detection value of the current detector and the reference value.

4. A switching regulator as claimed in claim 1, which comprises first and second regulator portions and wherein said reference signal shaping means has two sets of ½ frequency dividers corresponding to the first and second regulator portions and binary ring counters corresponding thereto, and said control signals generating means includes control signal output circuits used in transmitting control signals to the switching elements of the first regulator portion, and at least one of said output circuits associated with the second regulator portion having an inverter on the input thereto.

5. A switching regulator as claimed in claim 2, which comprises first and second regulator portions and wherein said reference signal shaping means has two sets of ½ frequency dividers corresponding to the first and second regulator portions and binary ring counters corresponding thereto, and said control signal generating means includes control signal output circuits used in transmitting control signals to the switching elements of the first regulator portion, at least one of said output circuits having an inverter on the input thereto and control signal output circuits used in transmitting control signals to the switching elements of the second regulator portion, and at least one of said output circuits associated with the second regulator portion having an inverter on the input thereto.

6. A switching regulator as claimed in claim 3, which comprises first and second regulator portions and wherein said reference signal shaping means has two sets of ½ frequency dividers corresponding to the first and second regulator portions and binary ring counters corresponding thereto, and said control signal generating means including control signal output circuits used in transmitting control signals to the switching elements of the first regulator portion, at least one of said output circuits having an inverter on the input thereto and control signal output circuits used in transmitting control signals to the switching elements of the second regulator portion, and at least one of said output circuits associated with the second regulator portion having an inverter on the input thereto.

7. A switching regulator as claimed in claim 1, wherein said phase difference signal generating means is comprised of a triangle generator.

8. A switching regulator as claimed in claim 1, wherein said phase difference signal generating means is comprised of a sawtooth generator.

* * * * *